United States Patent [19]
Masreliez

[11] Patent Number: 5,838,635
[45] Date of Patent: *Nov. 17, 1998

[54] THIN SPEED TRANSDUCER SENSOR

[76] Inventor: Karl Masreliez, 14606 SE. 50th St., Bellevue, Wash. 98006

[ * ] Notice: The term of this patent shall not extend beyond the expiration date of Pat. No. 5,581,515.

[21] Appl. No.: 741,817

[22] Filed: Oct. 31, 1996

Related U.S. Application Data

[63] Continuation-in-part of Ser. No. 338,648, Nov. 14, 1994, Pat. No. 5,581,515.

[51] Int. Cl.⁶ .............................. G01S 15/00; G01C 21/00
[52] U.S. Cl. ................................... 367/89; 73/181
[58] Field of Search ................. 367/89, 91, 90, 367/182, 184, 186, 187, 181

[56] References Cited

U.S. PATENT DOCUMENTS

| | | | |
|---|---|---|---|
| Re. 33,982 | 7/1992 | Boucher | 73/187 |
| 3,400,582 | 9/1968 | Warner | 73/181 |
| 3,503,258 | 3/1970 | Baker | 73/181 |
| 3,596,513 | 8/1971 | Sandstedt | 73/181 |
| 3,657,924 | 4/1972 | Kirk | 73/187 |
| 3,800,592 | 4/1974 | Jones, Jr. | 73/181 |
| 4,138,657 | 2/1979 | Shave | 340/3 D |
| 4,399,695 | 8/1983 | Peyton | 73/187 |
| 4,507,960 | 4/1985 | Hufnagel et al. | 73/187 |
| 4,528,652 | 7/1985 | Horner et al. | 367/162 |
| 4,534,307 | 8/1985 | Overs | 73/186 |
| 4,638,468 | 1/1987 | Francis | 367/153 |
| 4,653,319 | 3/1987 | Parsonage | 73/181 |
| 4,774,837 | 10/1988 | Bird | 73/181 |
| 4,805,157 | 2/1989 | Ricketts | 367/119 |
| 4,848,146 | 7/1989 | Bruno et al. | 73/181 |
| 4,914,565 | 4/1990 | Schnoeller et al. | 367/164 |
| 4,950,936 | 8/1990 | Rynne et al. | 367/164 |
| 5,003,820 | 4/1991 | Dittbrenner | 73/181 |
| 5,089,996 | 2/1992 | Masreliez | 367/89 |
| 5,091,893 | 2/1992 | Smith et al. | 367/153 |
| 5,235,557 | 8/1993 | Masreliez | 367/91 |
| 5,357,794 | 10/1994 | Nielsen | 73/181 |
| 5,581,515 | 12/1996 | Msreliez | 367/89 |

FOREIGN PATENT DOCUMENTS

| | | |
|---|---|---|
| 0 021 534 | 6/1980 | European Pat. Off. . |
| 2 336 019 | 12/1976 | France . |

*Primary Examiner*—Charles Jordan
*Assistant Examiner*—Theresa M. Wesson
*Attorney, Agent, or Firm*—David V. Carlson; Seed and Berry LLP

[57] ABSTRACT

A speed sensor for a ship, more particularly, a thin speed sensor which can be mounted in the hull of the ship and remain flush with the outer surface of the hull. The transducer assembly for the speed sensor is composed of two thin piezoelectric transducers mounted in a spacer plate that locates them in an exact position relative to each other. A baseplate and a coverplate are affixed by appropriate adhesive techniques to each side of the transducers to create a single transducer assembly. Holes through the baseplate and spacer plate permit electrical contact to each side of the transducers so that they may be stimulated to generate acoustic waves. The entire transducer assembly is significantly thinner than the hulls of most watercraft. Thus, a large hole completely through the hull is not necessary. Rather, a shallow recess approximately equal to the thickness of the transducer assembly is made in the hull to countersink the transducer assembly flush with the hull. A small hole to permit the electrical connections to be made to the transducer assembly can be made in the hull if desired. This invention provides for the easy manufacture and mass production of a thin transducer assembly which may be used on a wide variety of watercraft, including sailboards, waterskis, row boats, as well as speedboats and larger ships.

22 Claims, 13 Drawing Sheets ved Dec. 3, 1996.

THIN SPEED TRANSDUCER SENSOR

CROSS-REFERENCE TO PRIOR APPLICATION

This application is a continuation-in-part of U.S. patent application Ser. No. 08/338,648, now U.S. Pat. No. 5,581, 515, filed Nov. 14, 1994, allowed Dec. 3, 1996.

TECHNICAL FIELD

This invention relates to an acoustic transducer assembly and, more particularly, to a transducer assembly that may be useful in a ship's speed sensor and method of making and installing the same.

BACKGROUND OF THE INVENTION

While a ship is moving through the water, it is desirable to know the speed at which the ship is moving. A variety of sensors for determining the ship's speed with respect to the water are presently available. These sensors include conventional paddle-wheel sensors, ultrasonic Doppler shift sensors, a pair of side by side acoustic transducers, or other devices.

Because of friction between the hull and the water, the water speed relative to the boat varies within a boundary layer close to the hull. The water speed is zero at the hull and increases gradually with increasing distances from the hull. Therefore, non-acoustic speed sensors, like the paddle-wheel sensor, should stick out of the hull beyond the boundary layer to provide an accurate measurement. However, this makes the sensor vulnerable to damage by debris in the water. It also creates considerable drag on the ship, which is a factor in sailboat racing and for high-speed motor boats. To protect the sensor and minimize drag, the sensor is often not allowed to reach beyond the boundary layer with diminished measurement accuracy as result.

Another problem with the paddle-wheel sensor is that the rotation of the paddle-wheel sometimes is slowed down or completely stopped by seaweed that is caught by the paddle-wheel. When this happens, the sensor has to be removed from the hull and cleaned.

There are many different versions of speed sensor installations, including through hull mounted sensors and transom mounted sensors. The advantage of the transom mount is that a hole through the hull is not necessary. The disadvantage is that extra drag on the boat is created and that the sensor is more vulnerable to being damaged. Also, on larger motor boats and on sailboats the transom mount is not practical so a through hull sensor installation must be used. Presently, available speed sensors are quite bulky and require that a fairly large hole is made in the ship's hull for a through hull installation, which significantly increases the cost of the installation.

SUMMARY OF THE INVENTION

Accordingly, an object of the present invention is to provide a speed sensor that only requires a small hole through the hull when installed.

Another object of the invention is to provide a low cost ultrasonic speed sensor suitable for use on pleasure boats or pleasure craft.

Yet another object of the invention is to provide a speed sensor that measures water speed outside the boundary layer, although it is mounted flush to the hull for minimum drag.

Still another object of the invention is to provide a speed sensor that is very thin and can thus be mounted flush on watercraft having a very thin hull.

According to principles of the present invention, an ultrasonic speed sensor for use on ships comprises at least two thin piezoelectric transducers mounted in a frame that locates them in an exact position relative to each other. A method of manufacture according to principles of the present invention permits the sensor to be mass manufactured.

DETAILED DESCRIPTION OF THE INVENTION

Figure 1:
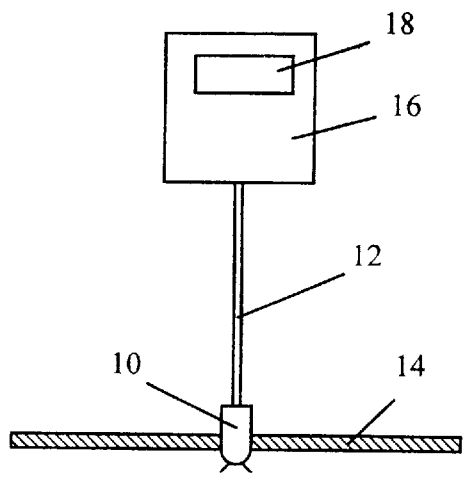
FIG. 1 is a schematic of a speed sensor mounted in the hull of a ship as is known in the prior art.

As shown in FIG. 1, a speed sensor 10 is mounted in a hull 14 of a ship. The speed sensor 10 produces electrical signals indicative of the ship's speed through the water. These signals are fed via the sensor cable 12 to electronic circuitry 16 and the result is displayed on a display 18.

A variety of speed sensors are known in the prior art. (The speed sensor may also be called log transducer or log sensor in the art.) The speed sensor for pleasure boats is usually an impeller or paddle wheel that is rotated by the water as the ship moves through the water. The rate of rotation of the paddle wheel is proportional to the boat speed or, more precisely stated, proportional to the water speed with respect to the boat at the location of the speed sensor. Different versions of existing paddle-wheel speed sensors include hull mounted and transom mounted sensors. The hull mounted sensors can be divided further into flush mount and mushroom mount sensors. Doppler shift speed sensors are also known in the art. According to the well-known principles of measuring speed based on Doppler shift, an acoustic wave is propagated into the water and the Doppler shift experienced by the acoustic wave reflected by the water is measured to determine the speed of the boat with respect to the water.

Figure 2A:
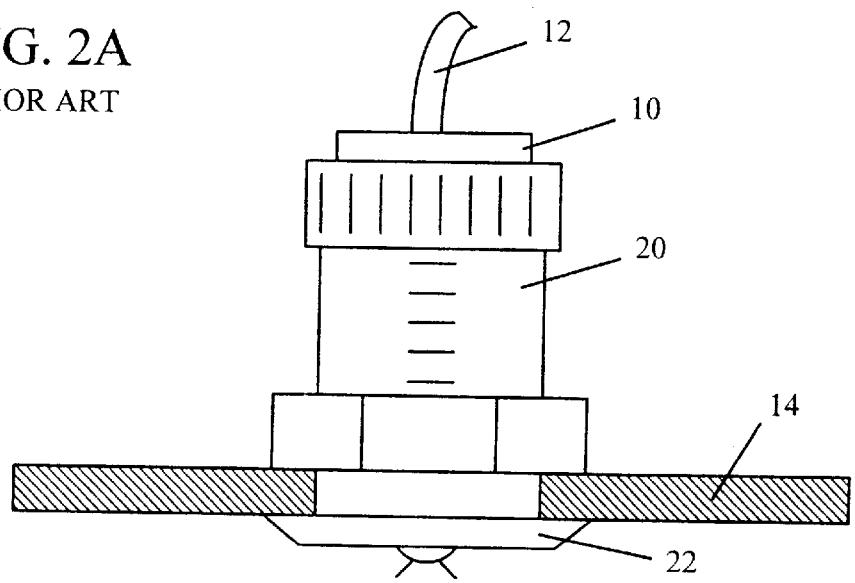
FIG. 2A is a cross-sectional view of a through hull sensor installation as is known in the prior art.

FIG. 2A shows a mushroom mount paddle-wheel sensor installation. Because the sensor 10 sometimes must be removed and cleaned from obstructing material, like seaweed, it is mounted in a feed through tube 20, through which it can be retracted to the inside of the boat. Thus, the diameter of the sensor installation is determined by the maximum lateral sensor dimension. For popular paddle-wheel sensors a rather large hole of 43 mm–51 mm diameter is needed in the hull 14 for the feed through tube 20. This increases the cost of the installation.

Figure 2B:
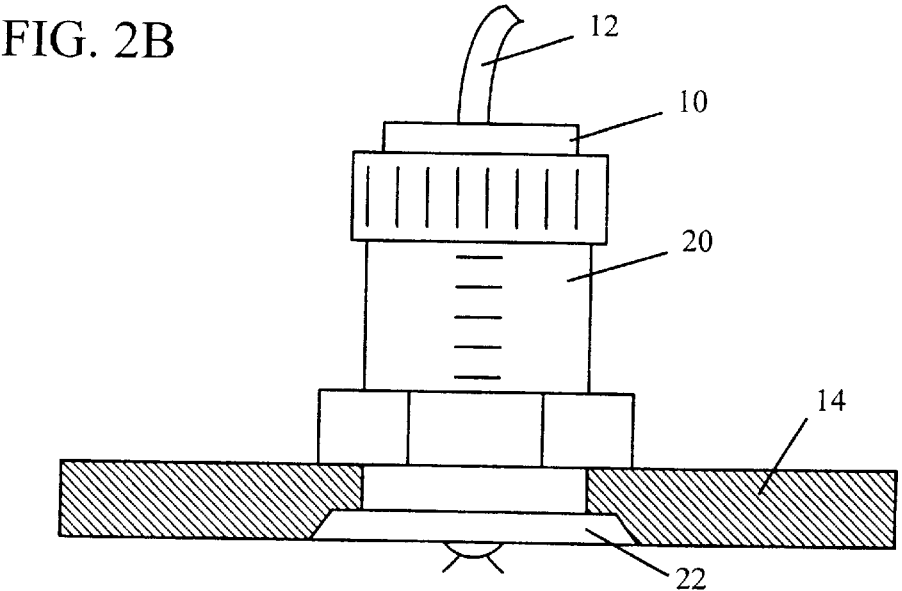
FIG. 2B is another cross-sectional view of a through hull sensor installation as is known in the prior art.

FIG. 2B shows a flush mount paddle-wheel installation. Here the flange 22 is countersunk into the hull 14 to minimize drag. Otherwise the installation is the same as for the mushroom mount installation. The same size of hole in the hull 14 has to be used as for the mushroom mount, i.e., 43 mm–51 mm diameter.

Figure 2C:
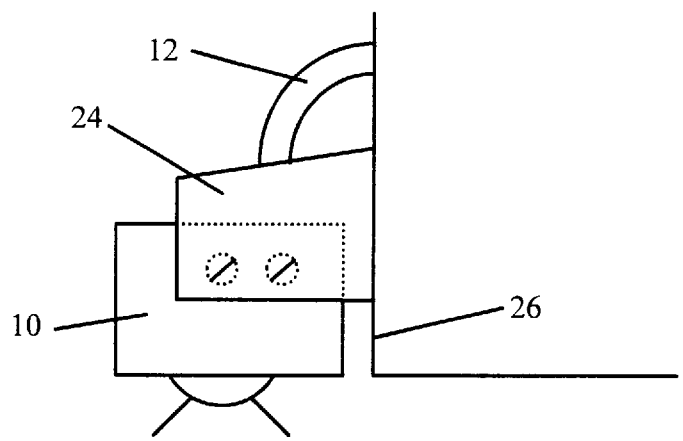
FIG. 2C is a side elevational view of a transom mounted speed sensor as is known in the prior art.

FIG. 2C shows a transom mount installation. The sensor 10 is held by a support arm 24, which extends from the transom 26. Although it has the advantage of not needing a hole through the hull, it has the disadvantage of being very vulnerable to damage. Also, the transom mount cannot be used on sailboats and larger motor boats.

Figure 3:
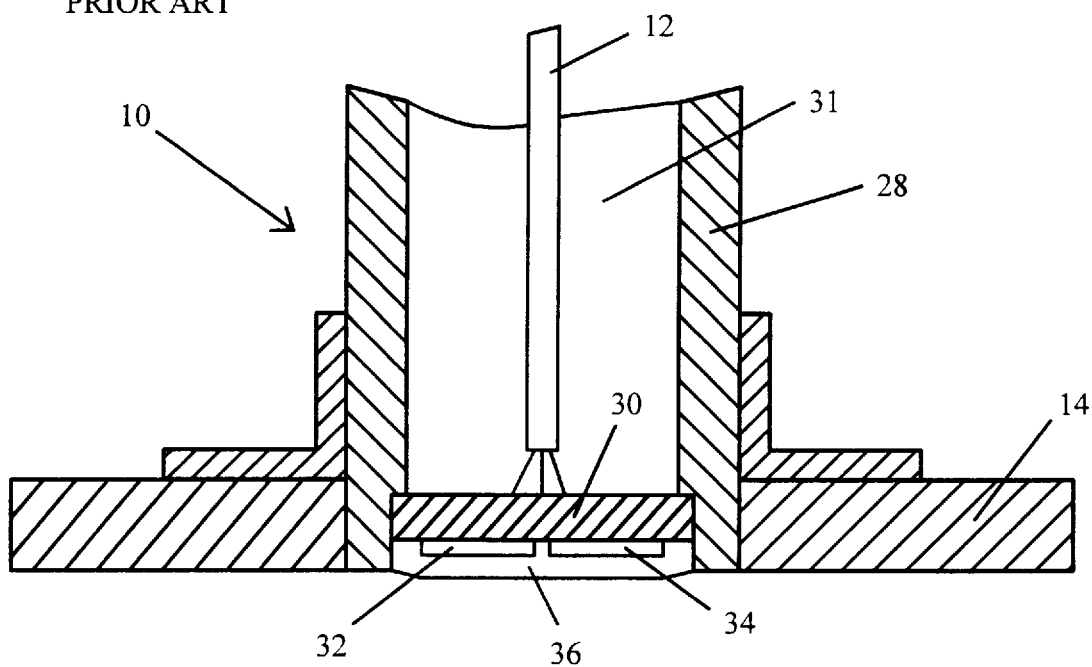
FIG. 3 is a cross-sectional view of a speed sensor known in the prior art.

FIG. 3 illustrates a relatively new prior art acoustic speed sensor. This acoustic speed sensor is of the type currently being manufactured and sold on the open market by a company titled Consilium Marine AB, of Sweden, and presently used on large merchant vessels. This prior art speed sensor 10 includes a housing 28 having a baseplate 30 mounted therein. Two acoustic transducers 32 and 34 are connected to the bottom of the baseplate 30 and positioned for transmitting acoustic waves into the water. The two acoustic transducers are positioned one after the other in the direction of the travel of the ship. An acoustic window 36 that is substantially flush with the hull permits the acoustic waves to pass there through and into the water. A backing 31, consisting of filled epoxy and located inside the baseplate, absorbs the sound waves transmitted through the baseplate to the inside of the sensor, preventing reflections from parts located inside the sensor. The distance between the respective center of the two transducers is approximately 10 mm. The transducers 32 and 34 simultaneously transmit ultrasonic energy into the water. The acoustic wave is transmitted in short pulses. Immediately after transmission from the transducers 32 and 34, they are switched to the receiver mode to receive the reflection of the acoustic signal from the water. The timing for receiving the acoustic signals from the water is selected to receive echoes in the range of seven to nine cm from the ship hull 14 so that it is outside the boundary layer. The acoustic frequency is generally in the range of 4 to 5 MHz.

As shown in FIG. 3, because the two transducers 32 and 34 are positioned one after the other in the longitudinal direction of travel of the ship, the aft transducer 34 travels the same path through the water as the forward transducer 32. Each transducer 32 and 34 transmits acoustic signals into the water and receives them from the water repeatedly, at a selected rate, such as 2 kHz. The signals received by the forward transducer 32 are stored. The signals received by the aft transducer 34 are compared to the signals previously received by the forward transducer 32. When the aft transducer 34 has moved forward in the water, the signal received by the aft transducer 34 will correlate to the signal previously received by the forward transducer 32, when it as over the same point of water earlier in time. The time difference between when transducer 32 passed over a spot and transducer 34 passed over the same spot can be used to calculate the ship's speed, that is, the signal received by the aft transducer 34 will correlate to that previously received by the forward transducer 32, but with a time delay τ that is inversely proportional to the speed of the ship. This time delay is measured and given the separation S between the two acoustic beams at the sampling distance, the ship's speed can be determined according to the formula:

$$\tau = \frac{S}{V}.$$

The speed V of the ship can thus be accurately determined because the other values are known. As will be appreciated, this technique may require averaging and correlation techniques known in the art, this sensor being commercially available from Consilium Marine AB of Sweden. This sensor requires a hole through the hull with a diameter of about 45 mm, which is fairly large. It also is quite thick, the sensor itself being thicker than the hull of many boats.

U.S. Pat. No. 5,235,557 also describes a transducer assembly that is advantageous for use as a combined speed and depth sensor.

Figure 4A:
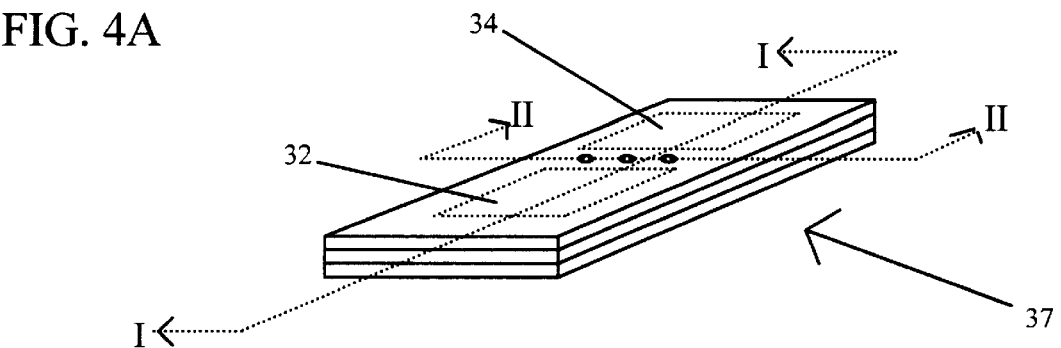
FIG. 4A is an isometric view of a transducer assembly constructed in accordance with this invention.

FIGS. 4A–4F show one embodiment of the present invention. In FIG. 4A a transducer assembly 37 is composed of a multilayer printed circuit board having acoustic transducers 32 and 34. The transducers have the same thickness as each other. The transducers 32 and 34 are composed of any acceptable piezoelectric material, such as a piezoceramic, lead zirconate titanate, piezoelectric polymer, a piezoelectric composite, or the like.

Figure 4B:
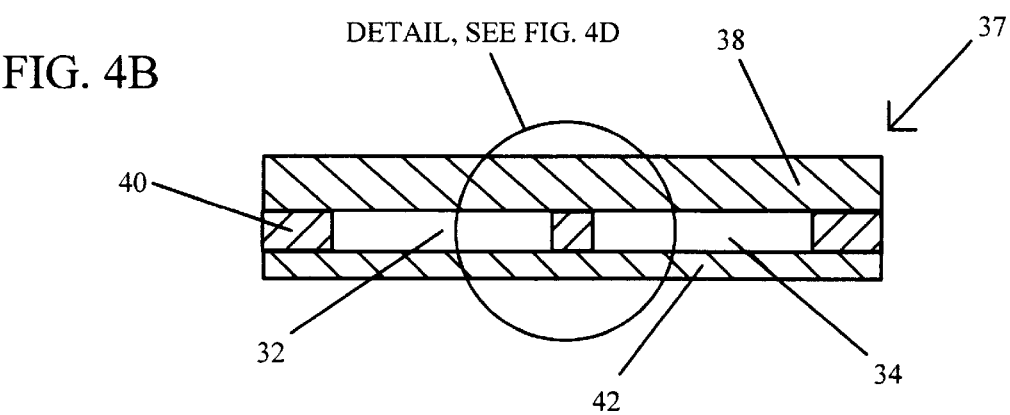
FIG. 4B is a cross-sectional view of the transducer assembly of FIG. 4A taken along lines I—I.

FIG. 4B shows the cross section I—I of FIG. 4A. The transducers 32 and 34 are positioned relative to each other by spacer plate 40, which has apertures 39 and 41 in it (see FIG. 4C) for the transducers 32 and 34. Spacer plate 40 has the same thickness as the transducers 32 and 34, or in one embodiment, is just slightly thinner.

The location of the apertures 39 and 41 are selected and precisely placed as appropriate for each transducer assembly design. The location and spacing of the transducers 32 and 34 is precisely determined by the apertures' locations. The bar 43 between the apertures 39 and 41 determines the distance between the transducers 32 and 34 in the direction of travel of the vessel. Similarly, the width, depth and length of the side wall members 69 accurately position the apertures 39 and 41 for retaining the transducers 32 and 34 at a desired location and spacing.

Spacer plates 40 can be mass produced inexpensively with the apertures precisely positioned using standard plastic molding techniques, milling of printed circuit boards, or other suitable technique applicable to the structure of spacer plate 40. As explained later, this permits very high quality transducer assemblies to be mass produced with a high degree of precision. The proper operation and reliability of the transducer assembly is thus improved by use of a spacer plate 40 as a positioning member for the transducers 32 and 34.

Transducers 32 and 34 are placed into the apertures 39 and 41 provided for them in spacer plate 40 and then the assembly is glued between baseplate 38 and cover 42. Alternatively, the spacer plate 40 can be attached to the baseplate 38 after which the transducers 32 and 34 are placed in the appropriate aperture, after which the coverplate 42 is attached, or potted (see FIGS. 6–8). The order of attachment may also be reversed in that the spacer plate 40 is first attached to the coverplate 42 and then, after transducers being inserted, to the baseplate 38. Baseplate 38, and coverplate 42, are made of a suitable material for electrodes being formed thereon, e.g., glass reinforced epoxy (glass fiber) of the kind that is commonly used for printed circuit boards. The spacer 40 may also be made of the same material as the baseplate and cover, or, alternatively may be made of a different material, such as a plastic.

The baseplate 38 is used for attaching the transducer assembly 37 to the ship. It also has the electrical connections to which the sensor cable is connected. Ideally, the baseplate 38 should be of a material that blocks sound by absorption and/or reflection, so that disturbing echoes from a sensor housing, in which transducer assembly 37 might be mounted, or from objects inside the hull 14 are prevented. The cover 42 functions as an acoustic window through which sound waves are transmitted and received and should be of a material that is transparent to sound at the operating frequency. On the baseplate 38 and the cover 42 there are printed conductor patterns, that connect the transducers 32 and 34 to the outside world.

Figure 4D:
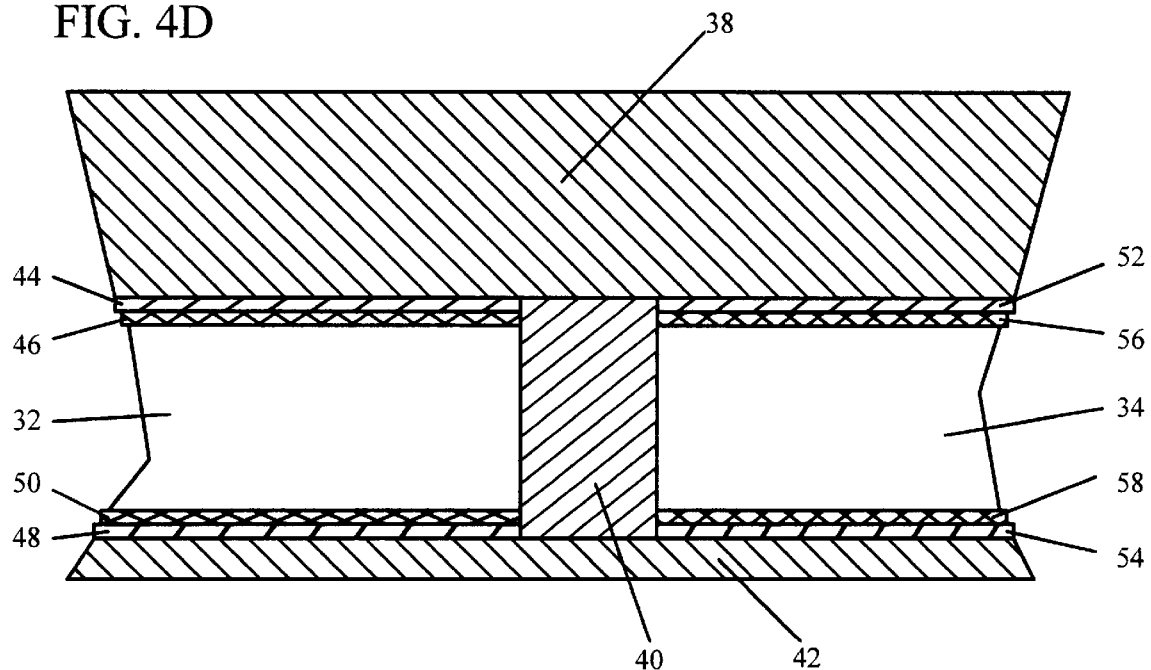
FIG. 4D is an enlarged cross-sectional view of the electrode arrangement taken from FIG. 4B.
Figure 4C:
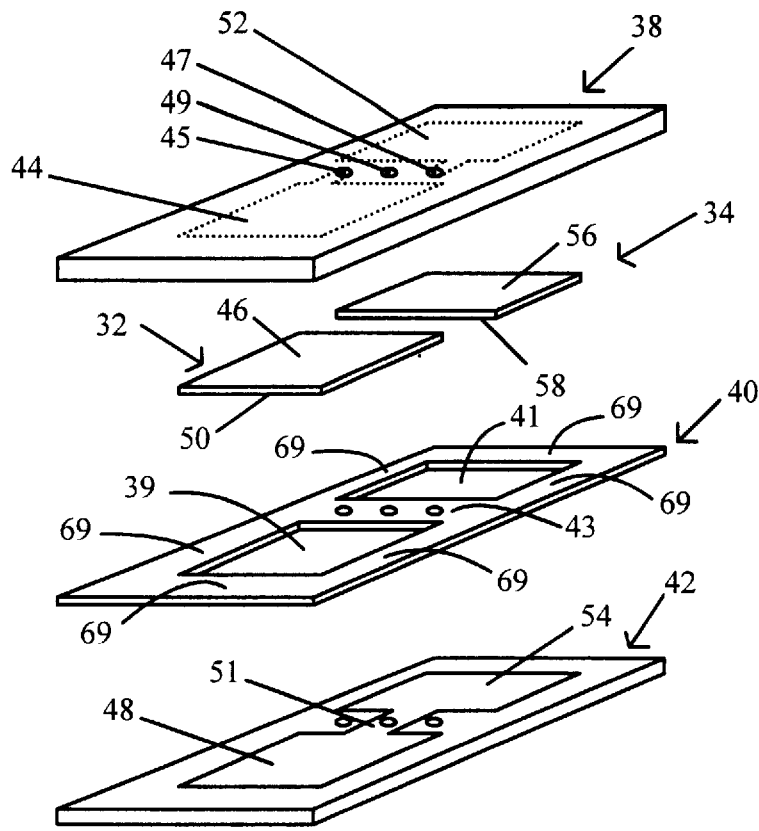
FIG. 4C is an exploded isometric view of the transducer assembly of FIG. 4A.

FIG. 4C shows an example of such conductor patterns. FIG. 4C is an exploded view of transducer assembly 37, showing the baseplate 38 with electrodes 44 and 52 on the bottom side of the baseplate 38. Electrodes 44 and 52 are connected via plated holes to pads 45 and 47, respectively, on the top side of the baseplate 38. Electrodes 48 and 54 on the top side of the cover 42 are connected to each other by conductor 51 and also via a plated hole to pad 49 on the top side of baseplate 38. Pads 45 and 47 carry signals to and from transducers 32 and 34 and pad 49 carries the signal ground.

FIG. 4D is an enlarged view of the encircled part of FIG. 4B, to show how the electrical connections are made to the acoustic transducers 32 and 34. Figure 4D shows electrodes 44 and 52 on the baseplate 38 and electrodes 48 and 54 on the cover 42. These electrodes have basically the same size, shape, and location as the corresponding electrodes 46, 50, 56, and 58 on the acoustic transducers 32 and 34.

The electrical connections between the electrodes on the baseplate 38 and the cover 42 and the electrodes on the transducers 32 and 34 are made when the transducer assembly 37 is glued together. For this it is not necessary to use a conductive glue. Any suitable adhesive materials or techniques are acceptable. It is actually not advisable to use a conductive glue in this case because it would be difficult to avoid unwanted short circuits. (However, an anisotropically conductive glue could possibly be used, i.e., a glue that is significantly more conductive across the thickness of the glue film than along the glue film but this would increase the manufacturing cost because of the more expensive glue.) Before assembling the transducer assembly 37, the surfaces of electrodes 44, 48, 52, and 54 on the baseplate 38 and on the cover 42, as well as the surfaces of electrodes 46, 50, 56, and 58 on transducers 32 and 34 are slightly roughened with sand paper. The spacer 40 with acoustic transducers 32 and 34 are then glued between baseplate 38 and cover 42 under pressure, which makes the glue film so thin that electrical contact is ensured by the roughness of the adjacent surfaces. This bonding technique is described in a handbook by the Dutch company Philips: Piezoelectric Ceramics, 2nd ed., 1974, Appendix B, Bonding techniques.

In one embodiment, the bonding process is further helped by the fact that the spacer 40 is somewhat thinner than the transducers 32 and 34, which concentrates the pressure on the electrode areas during the gluing. (A sheet of rubber is pressed against the cover 42 to distribute the contact pressure during the gluing process.) When the glue has cured, plated holes between conductor layers on the baseplate 38 and the cover 42 are made using techniques well known in the art of making multilayer printed circuit boards.

Figure 4E:
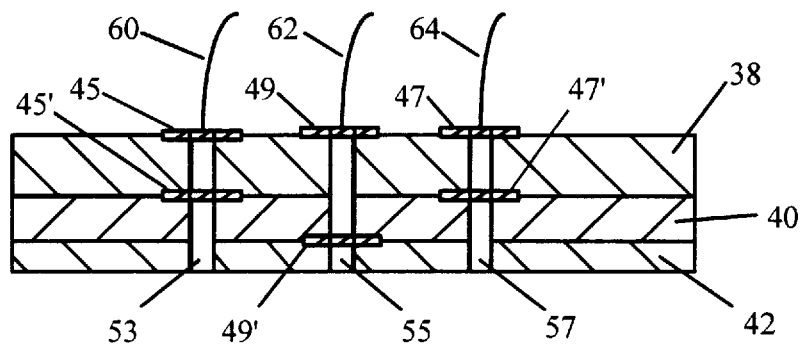
FIG. 4E is a cross-sectional view of a first embodiment of the electrical connections within a transducer assembly constructed in accordance with this invention.

FIG. 4E shows the cross section II—II of FIG. 4A through the three plated holes 53, 57, and 55, connecting to the signal pads 45 and 47 and to the ground pad 49, respectively. The pads 45' and 47' are located on the bottom side of the baseplate 38 and are connected to electrodes 44 and 52, respectively. The pad 49' is located on the top side of the cover and is connected, via conductor 51, to the electrodes 48 and 54. Wires 60, 62, and 64 are soldered to the pads 45, 49, and 47, respectively, for connection of the transducer assembly to the sensor electronic circuitry.

Figure 4F:
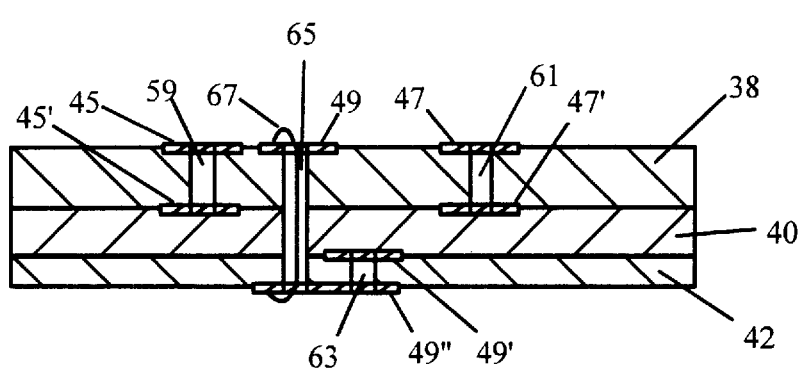
FIG. 4F is a cross-sectional view of an alternative embodiment of the electrical connections within a transducer assembly constructed in accordance with this invention.

FIG. 4F shows an alternative way of connecting the electrodes 44, 52, 48, and 54 to the top side of baseplate 38. Instead of making plated holes through the transducer assembly 37 after the transducer has been assembled, as just described, one can make plated holes 59 and 61 in the baseplate 38, before assembling the transducer, in order to connect electrodes 44 and 52 to the top side of baseplate 38. Before assembling the transducer, one can also connect the electrodes 48 and 54 on the cover 42 to the bottom side of the cover 42 via a plated hole 63 in the cover 42, which connects to pad 49" on the bottom side of cover 42. After assembling the transducer one has to drill a hole 65 through the transducer assembly 37 and connect pad 49" to the top side of the baseplate with a wire 67.

Figure 4G:
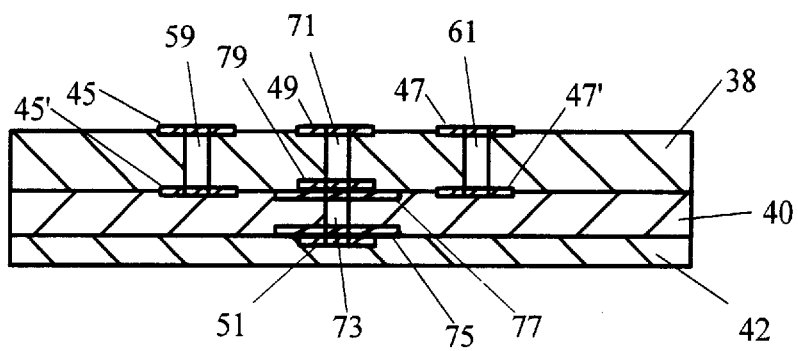
FIG. 4G is a cross-sectional view of a second alternative embodiment of the electrical connections within a transducer assembly constructed in accordance with this invention.

FIG. 4G shows a second alternative way of connecting the electrodes 44, 52, 48, and 54 to the top side of baseplate 38. Before assembling the transducer assembly 37, plated through holes 59, 61, and 71 are made in the baseplate 38 and a plated through hole 73 is made in the spacer 40. The conductor 51, the pads 75 and 77 of plated hole 73, and pad 79 of plated hole 71 are cleaned and sanded with sand paper so that their surfaces are slightly roughened. In the finished transducer assembly 37 the plated through holes 59 and 61 will carry signals between the top side of baseplate 38 and the electrodes 44 and 52 as described in conjunction with FIG. 4F. Conductor 51 is connected to electrodes 48 and 54. Conductor 51 also contacts pad 75 of plated hole 73 in spacer 40, because the contact pressure applied during assembling of the transducer assembly 37 makes the glue film so thin that electrical contact is ensured by the roughness of the adjacent surfaces. In the same way, pad 77 of plated hole 73 contacts pad 79 of plated hole 71 in baseplate 38. Thus, electrical connection is established between the electrodes 48 and 54 on the cover 42 and pad 49 on the top side of baseplate 38.

In one embodiment, the thickness of a finished transducer assembly 37 for 4 MHz operating frequency is 1.6 mm with thicknesses 0.031", 0.020", and 0.010" for the baseplate, spacer, and cover, respectively. (With a baseplate of thickness 0.010", i.e., the same as that of the cover, the thickness of transducer assembly 37 is only 1.1 mm for 4 MHz operating frequency.) An acoustic transducer assembly this thin can be used in a speed sensor that, including housing, is as thin, or thinner, than the flange 22 (FIG. 2A and FIG. 2B) of the installations of prior art sensors. This means that the sensor itself can be mounted to the outside of the ship's hull 14 as is the flange 22 in FIG. 2A, or countersunk flush to the hull 14 as is the flange 22 in FIG. 2B. Only the sensor cable 12 must penetrate the hull to the inside of the ship. Thus, only a small hole of about 5 mm diameter, accommodating the diameter of the sensor cable 12, needs to be made through the hull 14 instead of a hole that must accommodate the full sensor diameter, as is the case for the sensors of the prior art.

The thin speed sensor is mechanically supported by the hull and can be made as thin as possible without regard to mechanical strength. It does not need to withstand, by itself, the water pressure or other mechanical forces it is exposed to.

Figure 5A:
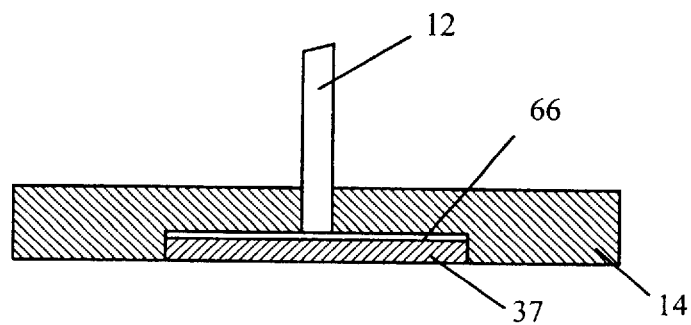
FIG. 5A is a cross-sectional view of a flush mounted sensor assembly according to the present invention.
Figure 5B:
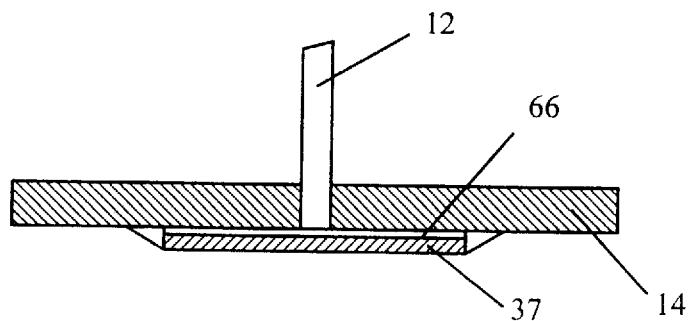
FIG. 5B is a cross-sectional view of a sensor assembly mounted on the outside of the hull according to the present invention.
Figure 5C:
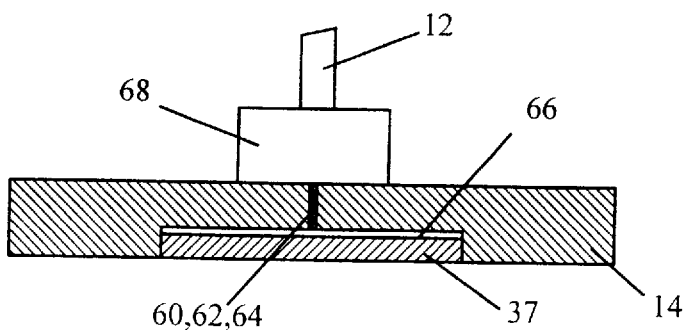
FIG. 5C is a cross-sectional view of a flush mounted sensor assembly with very small hole through the hull according to the present invention.
Figure 5D:
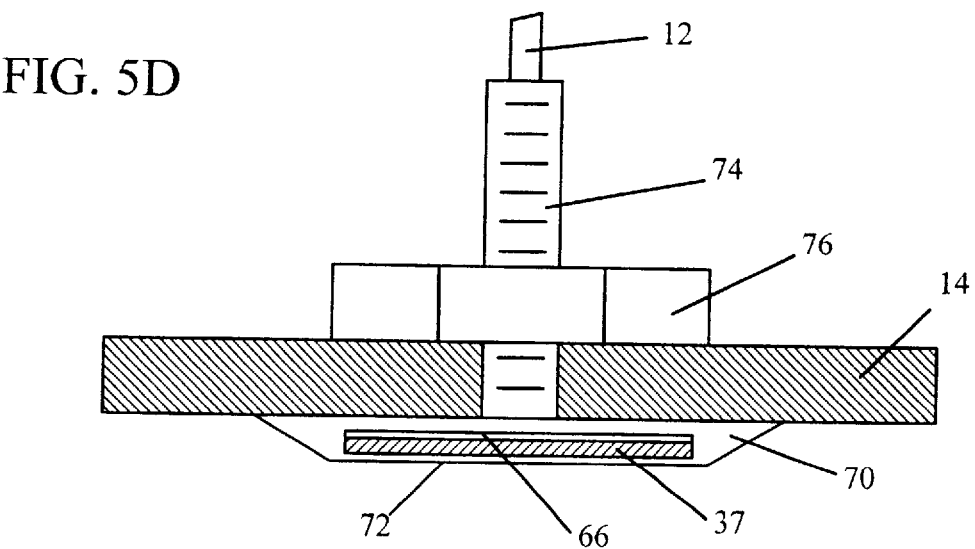
FIG. 5D is a cross-sectional view of a sensor assembly mounted on the outside of the hull with housing and stem according to the present invention.

In a preferred embodiment, the transducer assembly is thinner than the hull and has a back surface that is connected to the hull. The back surface of the transducer assembly is in contact with and supported by an outside surface of the hull. This outside surface of the hull is aligned with and along the exposed flat surface of the hull as shown in FIGS. 5B and 5D in one embodiment. In an alternative embodiment, this outside surface of the hull is an outside surface in a recess formed within the hull as shown in FIGS. 5A and 5C. In each of these embodiments, the majority of the back surface of the transducer assembly is supported by the hull itself and overlaps the hull so that the hull provides mechanical support and strength for the transducer assembly. In the embodiments shown in FIGS. 5A through 5E, in excess of 95% of the back surface of the transducer assembly overlaps and is supported by the hull. In these embodiments, the transducer assembly itself does not need to act as a member of the hull and therefore does not need to have sufficient strength to withstand the water pressure over this portion of its surface. Instead, the transducer assembly need only be sufficiently strong to provide a water tight seal to act as an effective plug for the small hole which has been made through the hull to accommodate the electrical connection to the transducer assembly.

The invention includes a watercraft and speed sensor combination comprising a watercraft having a hull, the hull having a certain thickness; a transducer assembly coupled to the hull, the transducer assembly being thinner than the hull and sufficiently thin that it cannot withstand the mechanical stress that the hull is subjected to during normal use, the transducer assembly being rigidly coupled directly to the hull for support, the hull providing the required mechanical strength, and a single hole through the hull for providing electrical connection to the transducer assembly, and the transducer assembly extending outward along the hull away from the hole for a selected distance to provide a water tight seal for the hole in the hull.

The invention also includes a watercraft and speed sensor combination comprising: a watercraft having a hull, the hull having a selected thickness; a transducer assembly thinner than the hull and having a substantially flat back surface that is connected to the hull, the back surface of the transducer assembly being supported by an outside surface of the hull and a majority of the back surface of the transducer assembly being coupled to an outside surface of the hull such that the hull provides the mechanical support for the transducer assembly.

On the other hand, prior art sensors, however, must be as mechanically strong as the hull because of the large hole in the hull necessary for their installation.

The fact that the inventive sensor is thin minimizes the drag it gives rise to. In the embodiments of FIGS. 5A and 5C in which the transducer is recessed against an outside surface of the hull, it has virtually zero drag. The transducer assembly can be glued to the hull, either on the outside surface or in a cavity in the hull so that it is flush with the hull. The glue also seals the hole for the sensor cable 12 and makes the installation watertight.

FIG. 5A shows transducer assembly 37 embedded in the hull 14, and FIG. 5B shows transducer assembly 37 mounted to the outside of the hull 14. A thin layer of backing 66 might be necessary to place between the transducer assembly 37 and the hull 14 in order to prevent sound, that is transmitted from the back of transducer assembly 37, from producing disturbing echoes from reflectors inside the hull. The backing 66 could be a piece of 0.8 mm (1/32") thick cork-rubber, or the like. It could also be a thin pocket of air behind the transducers 32 and 34 of transducer assembly 37.

Figure 5E:
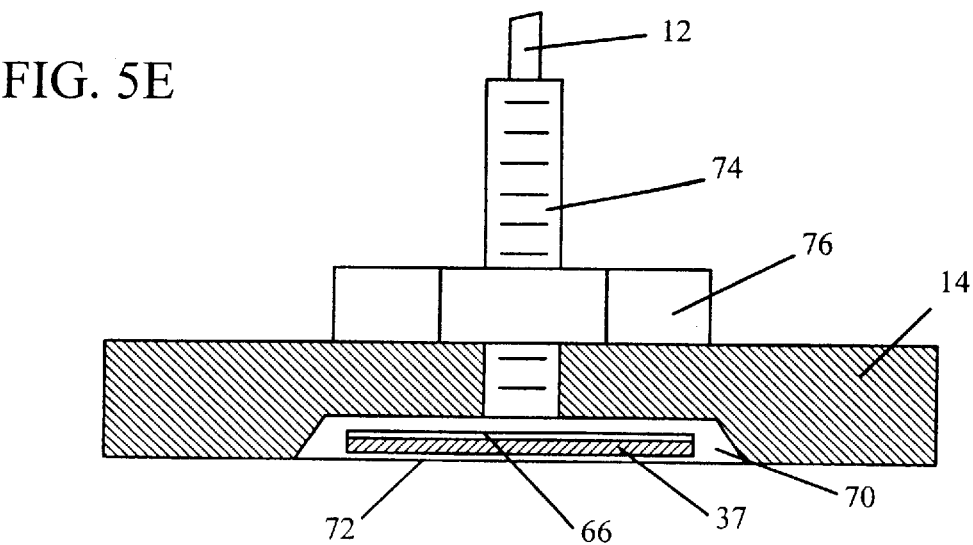
FIG. 5E is a cross-sectional view of a flush mounted sensor assembly with housing and stem according to the present invention.
Figure 5F:
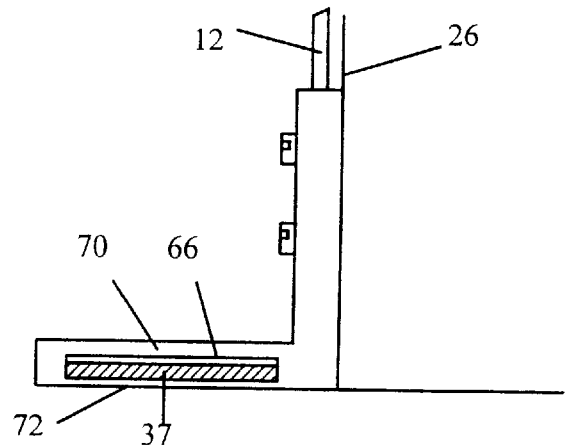
FIG. 5F is a side elevational view of a sensor assembly mounted to the transom of a boat according to the present invention.
Figure 5G:
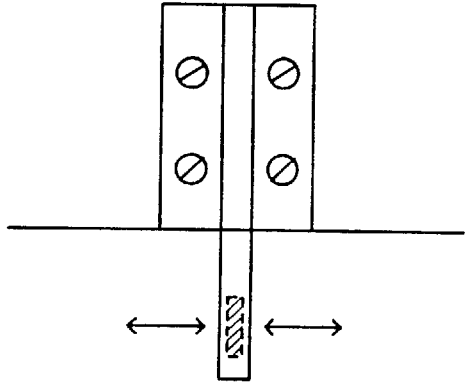
FIG. 5G is a rear view of a sensor assembly arrangement for mounting on the transom of a boat according to the present invention.
Figure 5H:
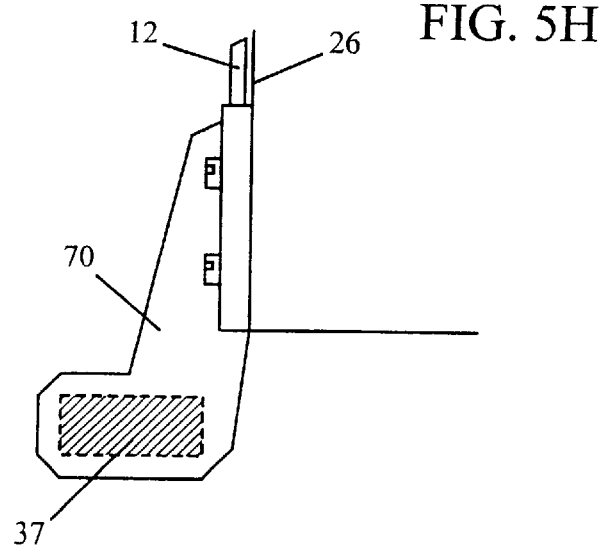
FIG. 5H is a side elevational view of the sensor assembly arrangement of FIG. 5G.
Figure 5I:
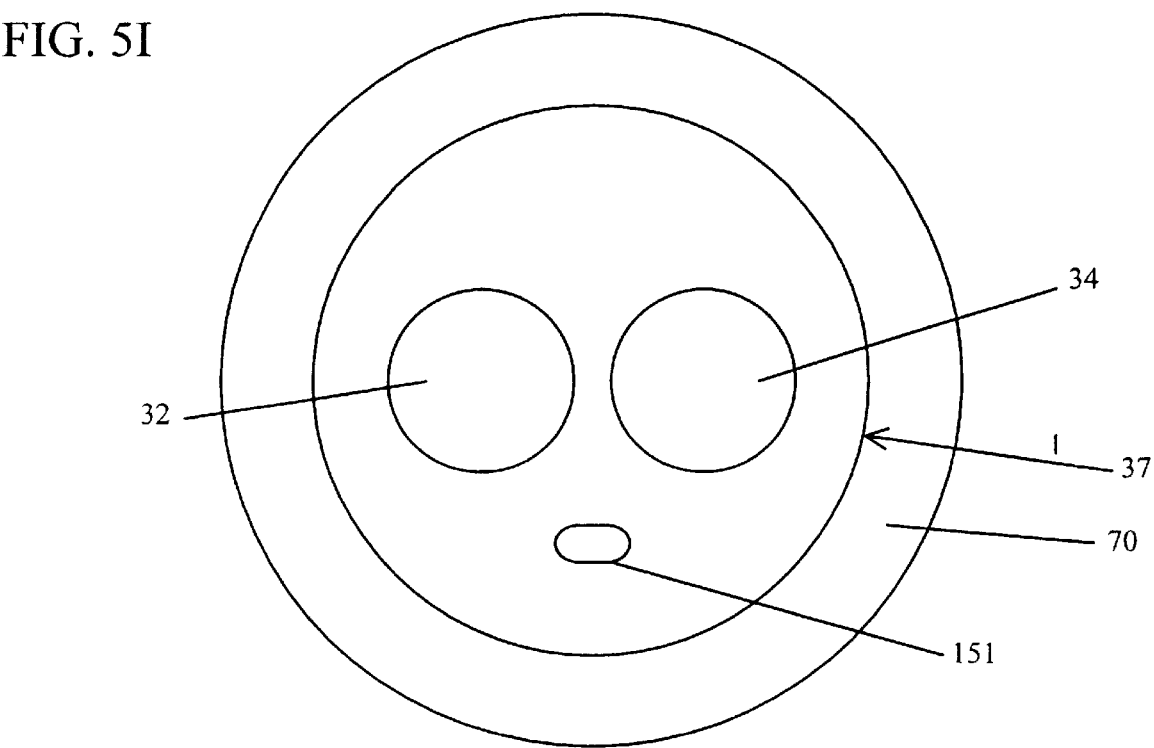
FIG. 5I is a bottom plan view of the transducer assembly shown in FIG. 5D, including a view of a temperature sensor within the transducer assembly.
Figure 5J:
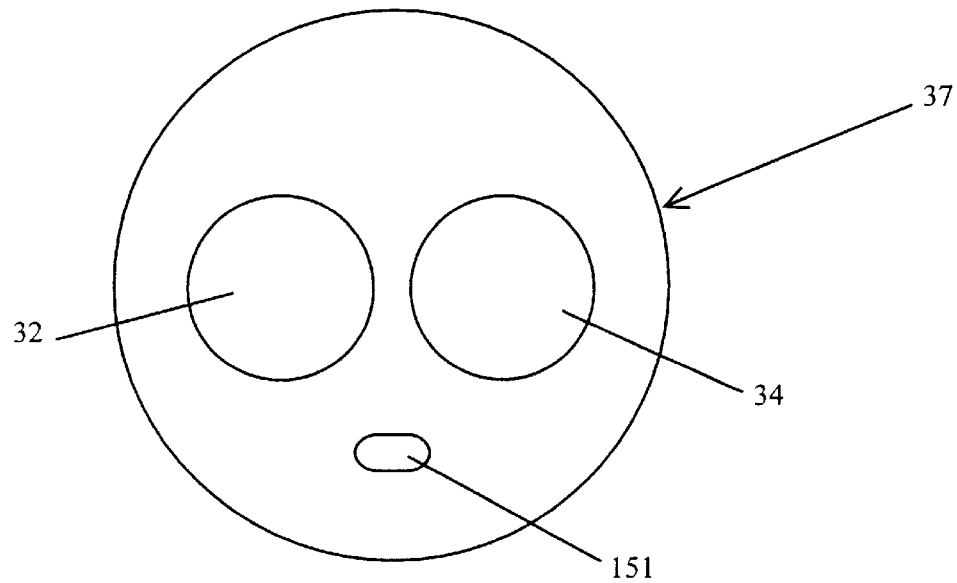
FIG. 5J is a bottom plan view of the transducer assembly of FIG. 5C, including a temperature sensor.

FIGS. 5C and 5J show an installation of transducer assembly 37, where thin wires 60, 62, and 64 connect the transducer to a junction box 68 placed immediately on the inside of the hull 14. In this case only a very small hole, about 2 mm diameter, is needed through the hull 14. The more rugged sensor cable 12 is then used between the junction box 68 and the electronic circuitry 16. The hole extending through the hull 14 of the watercraft can thus be quite small, significantly smaller than the diameter of the transducer assembly 37 or other prior art transducer assemblies, and the transducer assembly 37 can be placed in a recess in the hull 14 without extending through the hull to the top side because it is thinner than the hull 14.

FIG. 5J is a bottom plan view of the particular transducer assembly of FIG. 5C. As can best be seen from FIG. 5J, the transducers 32 and 34 are circular in shape as is the transducer assembly 37. The transducer assembly also includes a temperature sensor 151 mounted in or near the coverplate 42 for the measurement of sea water temperature. The temperature sensor 151 is a precision thermistor, but can also be a semiconductor temperature sensor which outputs either a voltage or a current that varies with the surrounding temperature in a measurable and known way. Electric wires connect the output of the temperature sensor 151 to the appropriate electronics. One or more through holes may be made through the coverplate 42, baseplate 38, and spacer plate 40 as necessary to accomplish these electrical connections in a manner similar to that shown in FIGS. 4E, 4F, and 4G. Both thermistor and semiconductor temperature sensors are very small and can easily be fitted into the transducer assembly without increasing the thickness of the transducer assembly or the diameter of the hole that is needed for the sensor cable through the hull.

FIGS. 5D, 5E, and 5I show mushroom mount and flush mount installations, and a plan view of each, respectively, corresponding to the prior art installations shown in FIGS. 2A and 2B. Transducer assembly 37 is placed in a housing 70 with an extra protective acoustic window 72, that might be part of the housing. A sound blocking backing 66 is also inserted to prevent spurious echoes from objects in the housing 70 or in the hull 14. A threaded stem 74, which is attached to the housing 70, is brought through the hull 14 and the sensor is fastened to the hull 14 with nut 76. The stem 74 also carries the sensor cable 12. The diameter of the stem is about 10 mm. The thickness of the sensor housing is about 5 mm or less. As best shown in FIG. 5I, the transducers 32, 34, as well as the transducer assembly 37 and the housing 70 are all circular in shape and the transducer assembly may include a temperature sensor 151 as previously described.

FIG. 5F shows a transom mount installation for the new sensor. The transducer assembly 37 is mounted in the horizontal part of a housing 70 and provided with an extra protective acoustic window 72, that might be part of the housing. A backing 66 is also installed behind the transducer assembly 37 for sound isolation. The vertical part of the housing 70 is mounted to the transom 26 of the boat.

FIGS. 5G and 5H are yet another installation of transducer assembly 37. Here the baseplate 38 is as thin as the cover 42 and the transducer is transmitting and receiving symmetrically using both sides of the transducer assembly 37. The transducer assembly 37 is mounted vertically in a housing 70 that is fastened to the transom 26 of the boat.

The hull 14 is broadly referred to herein and includes the hull of any watercraft. This includes any watercraft, such as a canoe, a kayak, a sail boat, a surf board, a jet ski, water skis, as well as row boats, power boats, pleasure crafts, large ships or any other watercraft. The transducer assembly of this invention is particularly useful for thin watercraft such as water skis and sail boards. The current state of the art does not provide any speed sensors to permit a sail boarder or water skier to know their true water speed. (As is known, the speed of the water skier is often very different from the speed of the boat.) A transducer assembly according to this invention is sufficiently smaller that it can be mounted flush with the running surface of the water ski and provide an accurate speed measure without having a cumbersome assembly on top of the water ski. The sensing electronics and display readout can be provided to the user by any convenient means, such as a wrist strap display, large display on the upper board surface, small stand with display, or the like. Similar mounting techniques with attendant advantages permit this sensor to be useful on any watercraft, from power boats and sail boats, to row boats and sail boards.

Figure 9A:
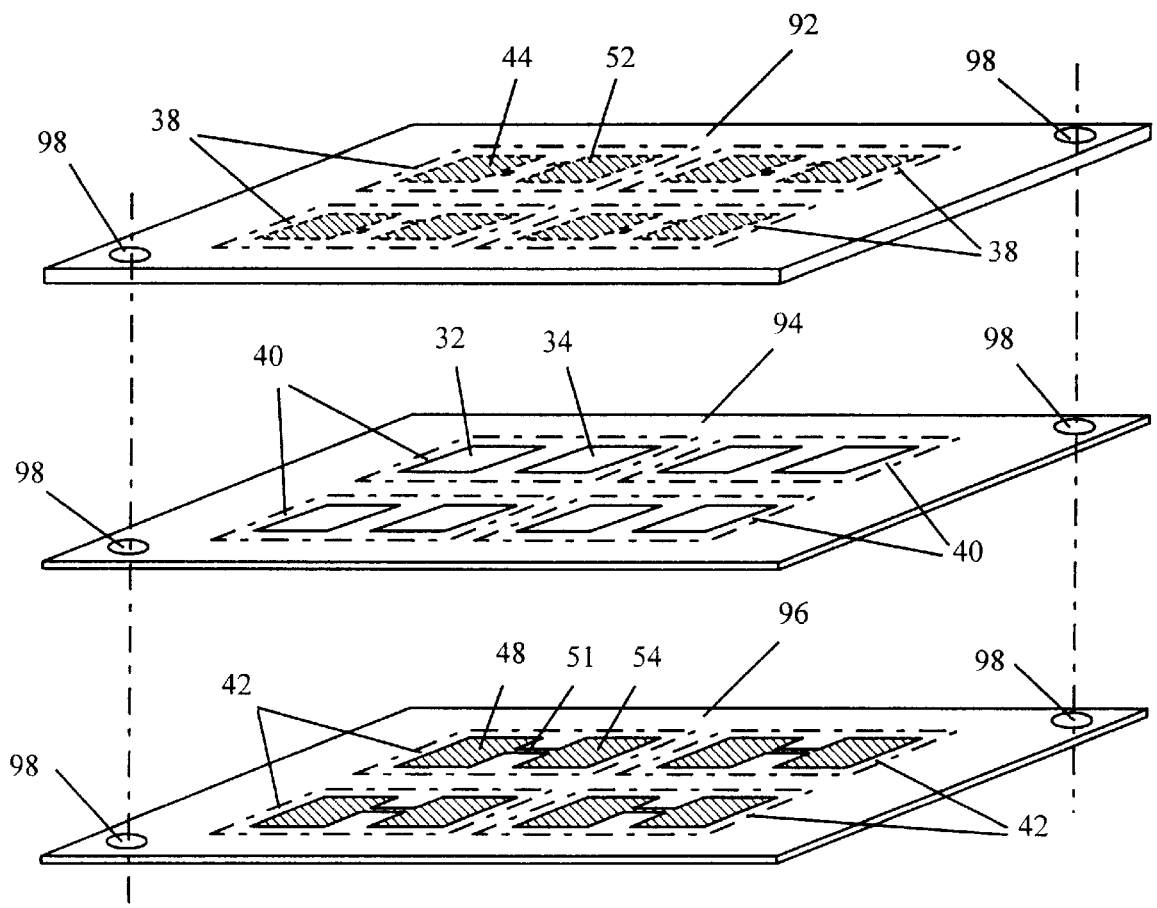
FIG. 9A is an isometric view of a process of assembling several transducer assemblies at the same time.

FIG. 9A illustrates a method of assembling a plurality of transducer assemblies at the same time. One can easily assemble many transducers 37 at the same time by making three large printed circuit boards, each containing two-dimensional arrays of the baseplate 38, the spacer 40, and the cover 42, respectively. FIG. 9A shows an example where four transducer assemblies 37 are assembled simultaneously. A two-dimensional array 94 of spacers 40, populated by two acoustic transducers 32 and 34 per array member, is glued under pressure between a second two-dimensional array 92 of baseplates 38 and a third two-dimensional array 96 of covers 42 to form a resulting two-dimensional array of transducers 37. As previously explained with respect to FIG. 4C, the transducers can first be placed in the appropriate apertures and then the spacer plate 40 attached to baseplates and coverplates or the spacer plate can be attached to either the baseplate or the coverplate and then the transducers inserted in the aperture, after which the other plate, whether baseplate or coverplate, is attached. Pins through the holes 98 accurately align the arrays on top of each other during the gluing process. When the glue has cured, the holes for connecting the electrodes of the transducers 32 and 34 to the output pads 45, 47, and 49 are drilled and plated, as previously described, for all the transducers 37 of the array, and last, the array is divided into separate transducers 37 by a suitable method such as by cutting, dicing, sawing, etc. An example: For acoustic transducers with 10 mm lateral dimension it is possible to manufacture, for instance, 63 transducer assemblies (126 total transducers) from two-dimensional arrays of baseplates, spacers, and covers, each array having a size 8.5"×11" (size A). If soldering or wire bonding had been used to connect wires from the electrodes of transducers 32 and 34 to adjacent conductor patterns or terminals, 504 solder joints or wire bonds would have been required for these 63 transducer assemblies, then numerous hand wire operations would be required. 2 bonds per wire, 2 electrodes per transducer, 2 transducers per transducer assembly=8 bonds per transducer assembly, 8×63=504. The present invention reduces the manufacturing cost of the transducer assembly 37, which enables its use in low cost speed sensors for pleasure boats and pleasure craft.

Figure 9B:
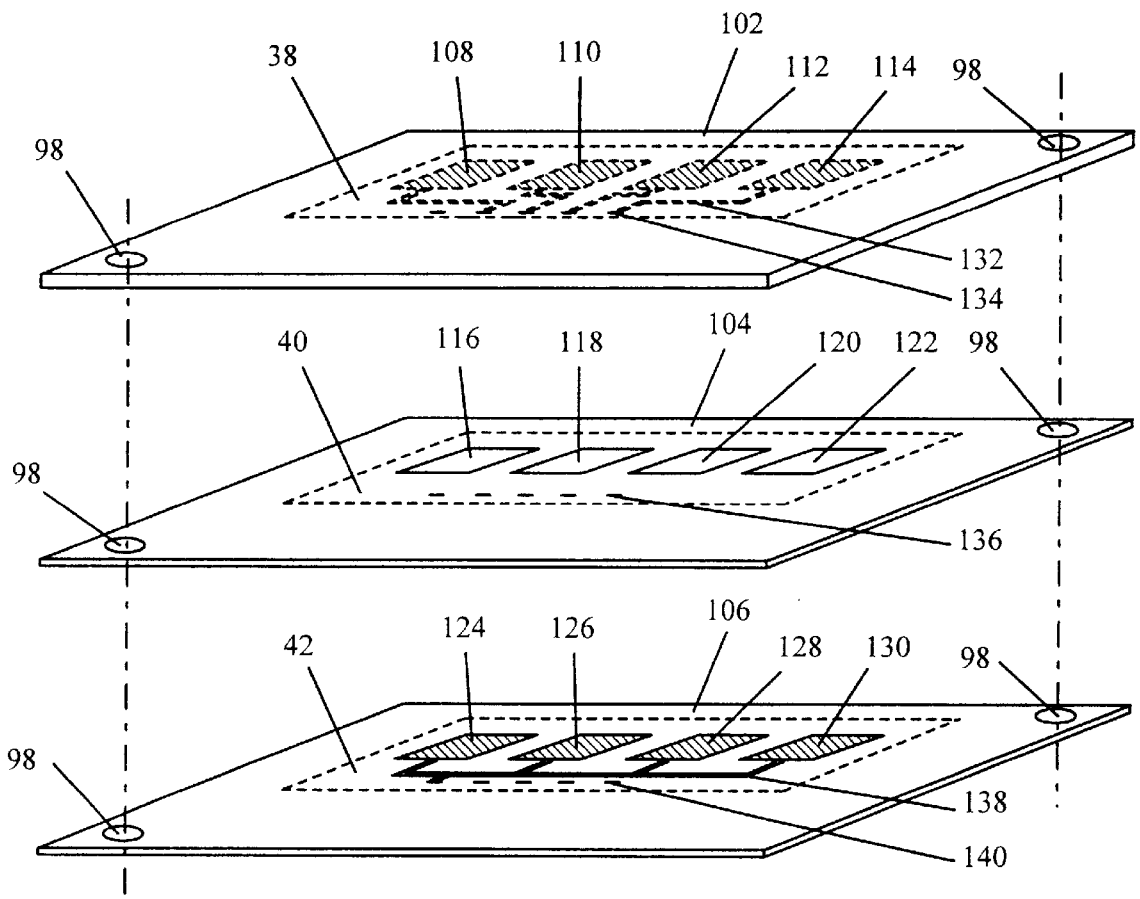
FIG. 9B is an isometric, exploded view of assembling a single transducer array.
Figure 9C:
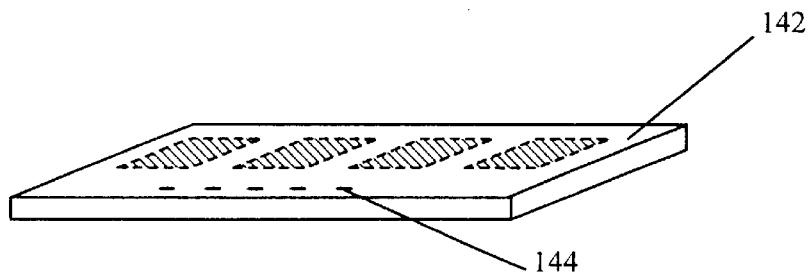
FIG. 9C is an isometric view of the assembled transducer array of FIG. 9B.

FIG. 9B and FIG. 9C show an example of a transducer assembly which has more than two transducers. In this example there are four transducers 116, 118, 120, and 122, which are aligned one after the other in a linear array. This transducer arrangement allows one to change the distance between the transmitted acoustic beams in a convenient way by switching between different transducer combinations. A short distance between the two beams is preferable to use at low speed to obtain a short measurement response time, the measurement response time being dependent on the time for reflectors to pass from one beam to the other. A long distance between the beams is preferable to use at high speed to increase the measurement accuracy, the measurement error being inversely proportional to the distance between the acoustic beams. The shortest distance between beams is that between transducers 116 and 118, between transducers 118 and 120, or between transducers 120 and 122. The longest distance between the beams is that between the transducers 116 and 122. Intermediate beam distances are obtained between transducers 116 and 120 and between transducers 118 and 122. The transducer assembly is most efficiently utilized if all beams are active simultaneously rather than just one pair of beams at a time. If all beams transmit and receive simultaneously, the particle transit time between all beam pair combinations can be determined simultaneously, which improves the measurement accuracy and shortens the measurement response time.

The linear array transducer of FIG. 9B and FIG. 9C, described above, can be manufactured in the same manner as the two-antenna transducer in FIG. 9A. One or more linear array transducers can be manufactured at the same time. For simplicity, in FIG. 9B only one linear array transducer is shown being manufactured. A layer 104 containing a spacer plate 40, which is populated by acoustic transducers 116, 118, 120, and 122, is glued under pressure between a second layer 102 containing a baseplate 38 and a third layer 106 containing a coverplate 42 to form a resulting linear array transducer. Pins through the holes 98 accurately align the layers 102, 104, and 106 on top of each other during the gluing process.

The spacer plate 40 of the transducer assembly of FIGS. 9A, 9B, and 9C includes a plurality of apertures that are precisely located with respect to each other and with respect to the edges of the spacer plate and alignment holes 98 to ensure that the transducers are properly positioned in the final transducer assembly, as previously discussed.

The baseplate 38 is provided with electrodes 108, 110, 112, and 114, and the coverplate 42 is provided with electrodes 124, 126, 128, and 130 which all make electrical contact with the electrodes of the transducers 116, 118, 120, and 122 during the gluing process as previously described in conjunction with FIG. 4A–FIG. 4D. Signal traces 132 on the baseplate 38, connected to the electrodes 108, 110, 112, and 114, are routed to pads 134 at the edge of the baseplate 38. Similarly, ground traces 138 on the coverplate 42, connected to the electrodes 124, 126, 128, and 130, are routed to one of the pads 140 at the edge of coverplate 42. When the glue has cured, the electrical connections between layers are made with plated through holes as previously described. Last, the linear array transducer 142 is cut to its final dimensions, see FIG. 9C. The terminals 144 at the edge of the linear array transducer 142 can be soldered directly to a sensor cable. Alternatively, a suitable connector, for connection of the sensor cable, is soldered to the terminals 144.

Because the speed sensor is an acoustic sensor that is used with a pulsed transmission, one can select to receive echoes from a water volume that is located some distance out from the sensor. Thus one can minimize drag and the risk of the sensor being damaged by debris in the water by mounting the sensor flush to the hull and still get accurate speed readings by selecting echoes from undisturbed water outside the boundary layer. Furthermore, the speed sensor does not have any moving parts that can wear out, be obstructed by seaweed, broken off by striking an object, and the like.

Figure 6:
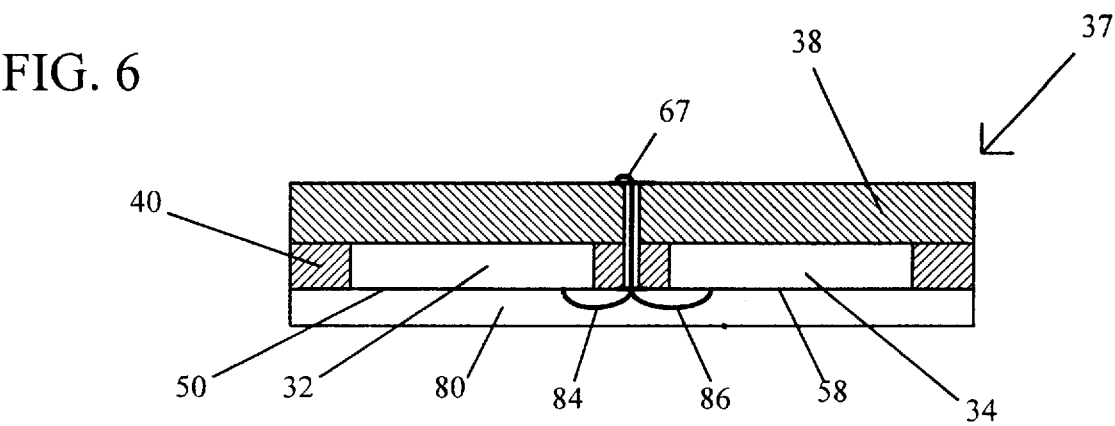
FIG. 6 is a cross-sectional view of an alternative embodiment of the transducer assembly according to the present invention.

A further embodiment of the present invention is shown in FIG. 6. Here the cover is replaced by an acoustic protective window 80 that is cast on top of the transducers 32 and 34 and the spacer 40. The manufacturing process is as follows: The spacer 40 with transducers 32 and 34 are glued under pressure to the baseplate 38 whereby the transducers 32 and 34 are bonded mechanically and electrically to the baseplate 38 as previously described. The transducer electrodes 50 and 58 facing away from the baseplate 38 are then connected with wires 84 and 86 to a conductor pattern on the bottom side of the spacer 40. A wire is then connected via a hole through spacer 40 and baseplate 38 to the top side of baseplate 38 for connection to the sensor cable. The conductor pattern on the bottom side of spacer 40 can be omitted by soldering wires to the transducer electrodes facing away from the baseplate 38 and bringing these wires, without intermediate connection to a conductor pattern on the bottom side of the spacer 40, through a hole through spacer 40 and baseplate 38 to the top of baseplate 38 for connection to the sensor cable. The acoustic window 80 is then cast in place.

Figure 7:
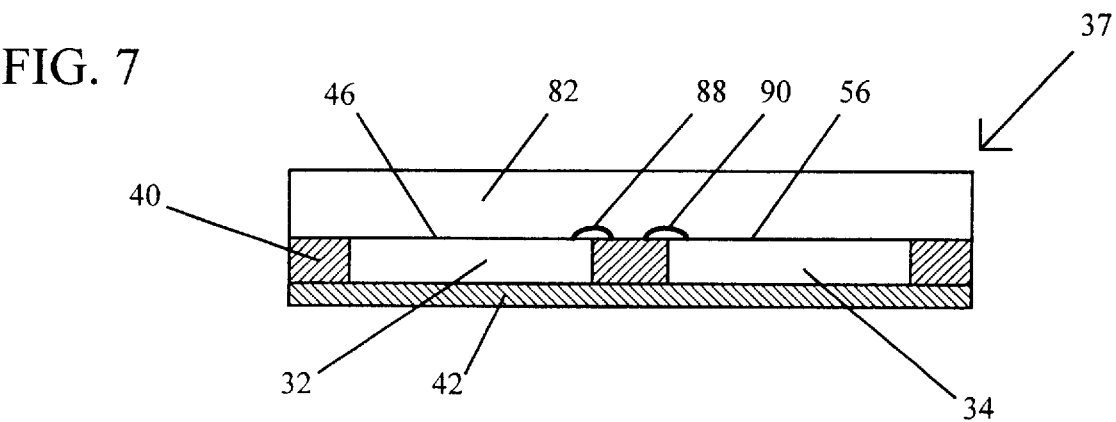
FIG. 7 is a cross-sectional view of a further alternative embodiment of the transducer assembly according to the present invention.

A further embodiment of the present invention is shown in FIG. 7. Here the baseplate 38 is replaced by a backing 82 that is cast in place. The manufacturing process is as follows: The spacer 40 with transducers 32 and 34 are glued under pressure to the cover 42 whereby the transducers 32 and 34 are bonded mechanically and electrically to the cover 42 as previously described. The transducer electrodes 46 and 56 facing away from the cover 42 are then connected with wires 88 and 90 to a conductor pattern on the top side of the spacer 40. Alternatively, one can solder wires to the transducer electrodes 46 and 56 and use these directly for connection to the sensor cable without intermediate connection to the top side of spacer 40. A wire is also brought via a hole through cover 42 and spacer 40 to the top side of spacer 40 for connection of the electrodes on cover 42 to the sensor cable in a manner already shown in FIG. 4F (not shown in this figure for simplicity and also because it was shown in prior figures). Wires are soldered, as needed, to the top side of spacer 40 for future connection to the sensor cable. Then backing 82 is cast in place.

Figure 8:
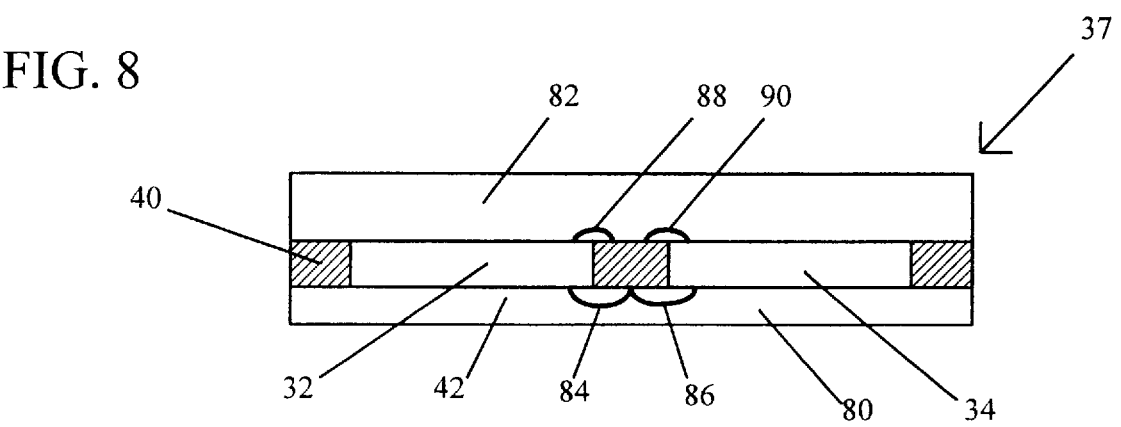
FIG. 8 is a cross-sectional view of a further alternative embodiment of the transducer according to the present invention.

A still further embodiment of the present invention is shown in FIG. 8. Here both the cover 42 and the baseplate 38 are replaced by an acoustic window 80 and a backing 82, respectively, that are cast in place. The manufacturing procedure is as follows: The transducers 32 and 34 are fastened to the spacer 40 so that they are coplanar with the spacer 40. The transducer electrodes are then electrically connected to the spacer 40 with wires 84, 86, 88, and 90 to conductor patterns on the spacer 40, and wires are soldered to spacer 40 for future connection to the sensor cable. Alternatively, wires are soldered to the transducer electrodes and brought directly out from the top side of spacer 40 for fixture connection to the transducer cable. The acoustic window 80 and the backing 82 are then cast in place.

Figure 10:
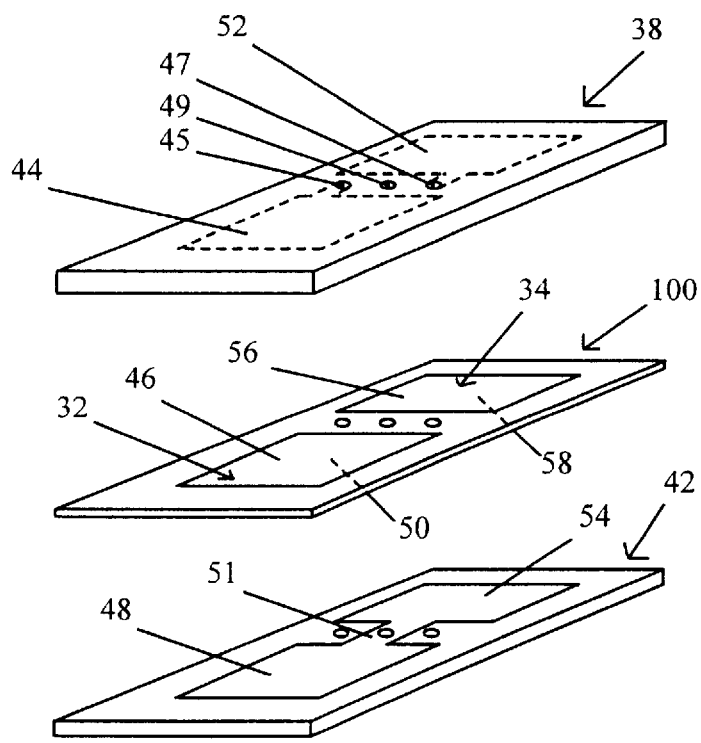
FIG. 10 is an exploded isometric view of a further alternative embodiment of the transducer assembly constructed in accordance with this invention.

A still further embodiment of the present invention is shown in FIG. 10. Here the spacer 40 with transducers 32 and 34 are all formed from a sheet 100 of piezoelectric material with conductive electrodes 46 and 56 on the top side of the sheet and conductive electrodes 50 and 58 on the bottom side of the sheet 100. The piezoelectric sheet 100 may be made of a piezoelectric polymer, like polyvinylidene difluoride (PVDF), or a piezoelectric composite, i.e., a combination of a piezoelectric ceramic with a passive polymer. The electrodes 46, 56, 50, and 58 define the location of the acoustic transducers 32 and 34. Thus, in this embodiment of the invention there is no need for a spacer 40 as an aid to accurately position the transducers 32 and 34 relative to each other. The placement of the transducers 32 and 34 are determined when the conductive electrodes are formed which may be done very accurately by the use of, for instance, photolithographic methods. The piezoelectric sheet 100 containing the transducers 32 and 34 is glued between a baseplate 38 and a cover 42 as previously described. The baseplate 38 may be made of printed circuit board material and the cover 42 may be made of a sheet of plastic, for instance Mylar. Both the baseplate 38 and the cover 42 may have electrodes 44 and 52, and 48 and 54, respectively, to make electrical contact with the electrodes 46, 56, 50, and 58 of the transducers 32 and 34. The baseplate 38 and cover 42 may also be provided with electrical conductor stripes for connection of the transducer electrodes to the sensor cable 12, as previously described. As an alternative, the electrodes 46, 56, 50, and 58 of the acoustic transducers 32 and 34 may be omitted (the piezoelectric sheet 100 is not metallized), in which case the acoustic transducers 32 and 34 are defined by the electrodes 44 and 52 on the baseplate 38 and the electrodes 48 and 54 on the cover 42. As a second alternative, the acoustic transducers 32 and 34 are provided with electrodes 46, 56, 50, and 58 and also electrical conductor stripes for connection of the electrodes to the sensor cable 12. In this case, the baseplate 38 and the cover 42 does not need to have any electrodes 44 and 52 on the baseplate 38, or electrodes 48 and 54 on the coverplate 42, or any electrical conductor stripes. They only have plated holes to bring the electrical contact for the signals to the top of the baseplate 38 for connection to the sensor cable 12. Other distributions of electrodes and conductor stripes between the piezoelectric sheet 100, baseplate 38, and cover 42 are also possible. The sensor cable 12 is connected to the pads 45, 47, and 49 as previously described.

Figure 11:
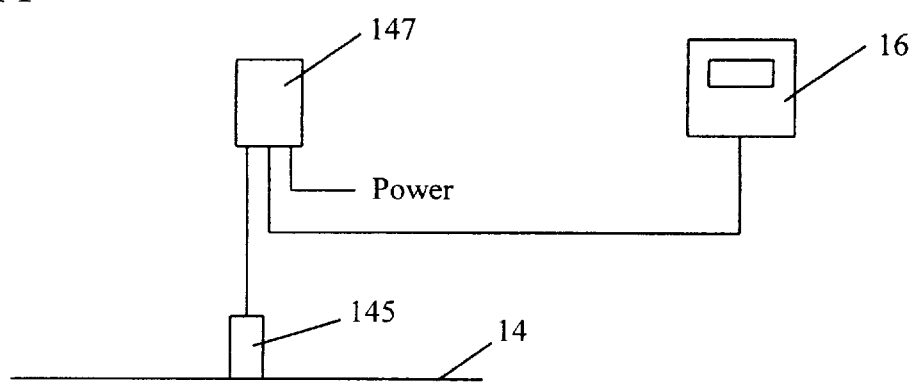
FIG. 11 is a schematic view of the inventive speed sensor and sensor electronics retrofit through the hull of a watercraft previously having a prior art speed sensor therein.

As shown in FIG. 11, the present design is also useful for fitting the inventive speed sensor into an existing paddle wheel sensor installation or other prior art installation. A typical retrofit installation of the invention into the hull of an existing ship is shown in FIG. 11. According to this embodiment, the housing 70 of the inventive transducer assembly 37 is made to fit into the existing sensor installation 145 that is through the hull of the watercraft. This is accomplished by removing the existing speed sensor and placing therein a blind plug for a period of time. This blind plug is normally used for filling the hole through the hull when the prior art speed sensor is removed for cleaning and maintenance. This blind plug has the same outer physical dimensions as the prior art sensor previously used in the hull but does not have the other features of the sensor such as a rotating paddle wheel, the accompanying electronics, or other sensor equipment.

According to the retrofitting design of the present invention, the inventive transducer is placed into the existing through hull installation 145 when the blind plug is removed and new sensor electronics 147 are installed which are of the type for receiving signals from the inventive transducer assembly. Then, the existing sensor cable from the existing display unit is attached into the sensing electronics 147 which have been provided, they being made with compatible outputs as will be easily accomplished by one of skill in the art. The signal from the new sensor electronics box 147 is selected to be the same as the signal output as would be provided from the electronics of the prior sensor so that the existing display unit 16 can easily be used. In this way, a current watercraft can be retrofit with an inventive sensor into the prior speed sensor installation because there is no need for making another hole in the hull and no changes need to be done on the bridge of the watercraft for a new display unit.

According to one embodiment for retrofitting the inventive sensor into an existing speed sensor hole installation, a single inventive sensor is designed with selected physical dimensions. This same transducer assembly 37 will be used for all installations. Then, adapters and seal rings of various sizes are provided that permit the basic sensor to be connected into the hole through the watercraft. For example, if the hole is relatively large in diameter, a sealing ring and an adapter that has the same outside dimensions as the hole in the hull with an aperture for receiving the inventive sensor would be used. The adapter connects to the inventive sensor and then has its outer edges sized to fit the hole that is through the hull for the prior speed sensor installation. The appropriate sized adapters can be manufactured using methods known to those of skill in the art.

While the transducers 32 and 34 have been shown in some of the embodiments as being square or circular in shape, these are interchangeable and other shapes are also usable, for instance, rectangular, or the like.

Other patterns of conductor stripes and plated holes for connection of the electrodes of transducers 32 and 34 to the top of baseplate 38 than those described are possible. Sometimes, it might be preferable to route the signals from the electrodes 48 and 54 on the cover 42 separately to the top of baseplate 38 instead of, as described, connecting them on the cover 42 via stripe 51. And sometimes, as, for instance, for the transducer configurations of FIGS. 5F, 5G, and 5H, it is more convenient to route the signals from the electrodes 48 and 54 on the cover 42 to the bottom of cover 42 where they are connected directly to the sensor cable 12, rather than to route them to the top of baseplate 38. The temperature sensor described in conjunction with FIG. 5I and FIG. 5J can also be incorporated in any of the other described embodiments of the invention.

According to principles of the present invention, the transducer assemblies taught herein may also be used in other fields after they are assembled. For example, the linear array of FIGS. 9B and 9C can be adapted for use in medical imaging, nondestructive testing or other uses that require the transmission and receiving of acoustic beams.

While various embodiments have been described in this application for illustrative purposes, the claims are not limited. Many modifications can be made to the structures shown and described herein that take advantage of the present invention. Any equivalent method or device operating according to principles of the invention falls within the scope thereof.

I claim:

1. A watercraft and speed sensor combination comprising:
a watercraft having a hull, the hull having a certain first thickness and a mechanical strength; and
a transducer assembly coupled to the hull, the transducer assembly having a second thickness, the second thickness being thinner than the hull, the transducer assembly having a mechanical strength less than the mechanical strength of the hull, yet sufficient to provide a watertight seal between itself and the hull, and the transducer assembly being rigidly coupled directly to the hull for support, the hull providing the required mechanical strength, and a single hole through the hull for providing electrical connection to the transducer assembly, and the transducer assembly extending outward along the hull away from the hole to provide the watertight seal for the hole in the hull.

2. The combination of claim 1 wherein the transducer assembly is mounted on the outside surface of the hull.

3. The combination of claim 1, further including a recess in the hull and wherein the transducer assembly is mounted in the recess in the hull, with the face of the transducer flush with the outside surface of the hull.

4. A watercraft and speed sensor combination comprising:
a watercraft having a hull, the hull having a certain thickness;
a transducer assembly coupled to the hull, the transducer assembly including a plurality of piezoelectric transducers, a coverplate, a baseplate and a plurality of electrical conductors and a spacer plate, the transducers being positioned in the same plane;

electrically conductive through the baseplate and through the spacer plate and electrically contacting electric regions on the transducers;

a hole extending completely through the hull;

a plurality of electrical conductors coupled to the transducer assembly via the electrically conductive paths through the baseplate and permitting electrical signals to be transmitted to and from the transducer assembly through the hole in the hull;

a sensor electronics unit coupled to the electrical conductors for sensing the speed of the watercraft; and a visual display read out coupled to the sensor electronics unit for displaying the speed of the watercraft.

5. The combination according to claim 4, further including an electrode coupled to the surface of the baseplate that is adjacent the transducers and the electrode is positioned in contact with a transducer within a plurality of transducers for providing electrical contact to the transducer.

6. The combination according to claim 4, further including an electrode coupled to the surface of the coverplate that is adjacent the transducers and the electrode is positioned in contact with a transducer within a plurality of transducers for providing electrical contact to the transducer.

7. The combination according to claim 4 wherein the plurality of electrical conductors includes a first electrical conductor extending through the baseplate, a second electrical conductor extending through the spacer plate, a third electrical conductor electrically contacting a front face of a transducer within a plurality of the transducers and the first electrical conductor making electrical contact with the second electrical conductor and the second electrical conductor making electrical contact with the third electrical conductor.

8. The combination of claim 4, further comprising a recess in the hull of the watercraft, the recess having a depth approximately equal to the thickness of the transducer assembly, the transducer assembly being within the recess such that the outer surface of the transducer assembly is generally flush with the surface of the hull.

9. The combination of claim 4 wherein the transducer is mounted on the outside surface of the hull.

10. The combination according to claim 4 in which said coverplate comprises an acoustic protective window that is cast on top of the transducers and the spacer plate.

11. The combination according to claim 4 in which said baseplate comprises a backing that is cast onto the back of the transducers and the spacer plate.

12. The combination according to claim 4 wherein the coverplate is in the form of an acoustic window cast onto the front surface of the transducers and spacer plate and the baseplate is in the form of a backing layer that is cast into place on the back side of the transducers and spacer plate.

13. The combination according to claim 4 wherein said spacer plate is slightly thinner than the transducers for ensuring solid contact between the transducers and the baseplate and the coverplate.

14. The combination of claim 4 wherein the electrical conductors are relatively thin electrical conductors and the hole in the hull is of a small diameter to approximately only allow the electrical conductors to pass therethrough.

15. The combination of claim 4, further comprising an acoustic damping material positioned between the transducer assembly and the hull of the watercraft.

16. The combination of claim 4, further comprising an extra protective acoustic window on the outside surface of the transducer assembly.

17. The combination of claim 4, further comprising a housing with a stem, the transducer assembly being attached within the housing, the stem serving as a conduit for the electrical conductors, and the stem going through the hole in the hull into the hull interior where it is fastened to the hull so that the housing with the transducer assembly becomes securely attached to the hull.

18. The combination according to claim 4, further including:

a temperature sensor within the transducer assembly positioned to sense the temperature of the sea water; and electrically conductive wires extending from the temperature sensor to an electronic sensing unit for providing the temperature of the sea water.

19. A watercraft and speed sensor combination comprising:

a watercraft having a hull, the hull having a certain thickness;

a transducer assembly coupled to the hull, the transducer assembly including a plurality of piezoelectric transducers, a coverplate, a baseplate and a plurality of electrical conductors and a spacer plate;

electrically conductive paths through the baseplate and through the spacer plate and electrically contacting regions on the transducers;

a hole extending completely through the hull;

a plurality of electrical conductors coupled to the transducer assembly via the electrically conductive paths through the baseplate and permitting electrical signals to be transmitted to and from the transducer assembly through the hole in the hull, the plurality of electrical conductors including an electrical conductor extending through said baseplate and through said spacer plate for providing electrical contact to a lower surface of said piezoelectric transducers;

a sensor electronics unit coupled to the electrical conductors for sensing the speed of the watercraft; and a visual display read out coupled to the sensor electronics unit for displaying the speed of the watercraft.

20. A watercraft and speed sensor combination comprising:

a watercraft having a hull, the hull having a certain thickness;

a transducer assembly coupled to the hull, the transducer assembly including a plurality of piezoelectric transducers, a coverplate, a baseplate and a plurality of electrical conductors and a spacer plate, the transducers being positioned approximately in the same plane as the spacer plate;

electrically conductive paths through the baseplate and through the spacer plate and electrically contacting electric regions on the transducers;

a hole extending completely through the hull;

a plurality of electrical conductors coupled to the transducer assembly via the electrically conductive paths through the baseplate and permitting electrical signals to be transmitted to and from the transducer assembly through the hole in the hull, the plurality of electrical conductors including an electrical conductor extending through said baseplate, through said spacer plate, and through said coverplate for providing electrical contact to a lower surface of said piezoelectric transducers;

a sensor electronics unit coupled to the electrical conductors for sensing the speed of the watercraft; and a visual display read out coupled to the sensor electronics unit for displaying the speed of the watercraft.

21. A watercraft and speed sensor combination comprising:

a watercraft having a hull, the hull having a certain thickness;

a transducer assembly coupled to the hull, the transducer assembly including a plurality of piezoelectric transducers, a coverplate, a baseplate and a plurality of electrical conductors and a spacer plate, the transducers being positioned approximately in the same plane as the spacer plate;

electrically conductive paths through the baseplate and through the spacer plate and electrically contacting electric regions on the transducers;

a hole extending completely through the hull;

a plurality of electrical conductors coupled to the transducer assembly via the electrically conductive paths through the baseplate and permitting electrical signals to be transmitted to and from the transducer assembly through the hole in the hull, the plurality of electrical conductors including an electrical conductor extending through the baseplate and electrically contacting a back face of a transducer within the plurality of transducers;

sensor electronics unit coupled to the electrical conductors for sensing the speed of the watercraft; and a visual display read out coupled to the sensor electronics unit for displaying the speed of the watercraft.

22. An apparatus comprising:

a plurality of piezoelectric transducers having respective top and bottom surfaces and having approximately the same thickness as each other;

a base plate in contact with a top surface of said transducers;

a spacer plate having a plurality of apertures therethrough, the spacer plate having a selected thickness of approximately the same thickness as the piezoelectric transducers, the piezoelectric transducers being positioned in the apertures such that the top and bottom surfaces of the transducers are approximately in the same plane as the respective top and bottom surfaces of the spacer plate;

a coverplate in contact with a bottom surface of said transducers;

electrically conductive paths extending from contact points on the baseplate, through the baseplate and through the spacer plate and electronically contacting the transducers;

a watercraft having a hull the hull having a selected thickness;

a hole extending completely through said hull;

a plurality of electrical conductors extending through said hull and contacting said transducers; and wherein said baseplate is positioned in contact with said hull along an outer surface of said hull.

* * * * *